No. 847,338. PATENTED MAR. 19, 1907.
W. H. HOYT.
APPARATUS FOR MAKING FLAT TALKING MACHINE RECORDS.
APPLICATION FILED FEB. 6, 1906.
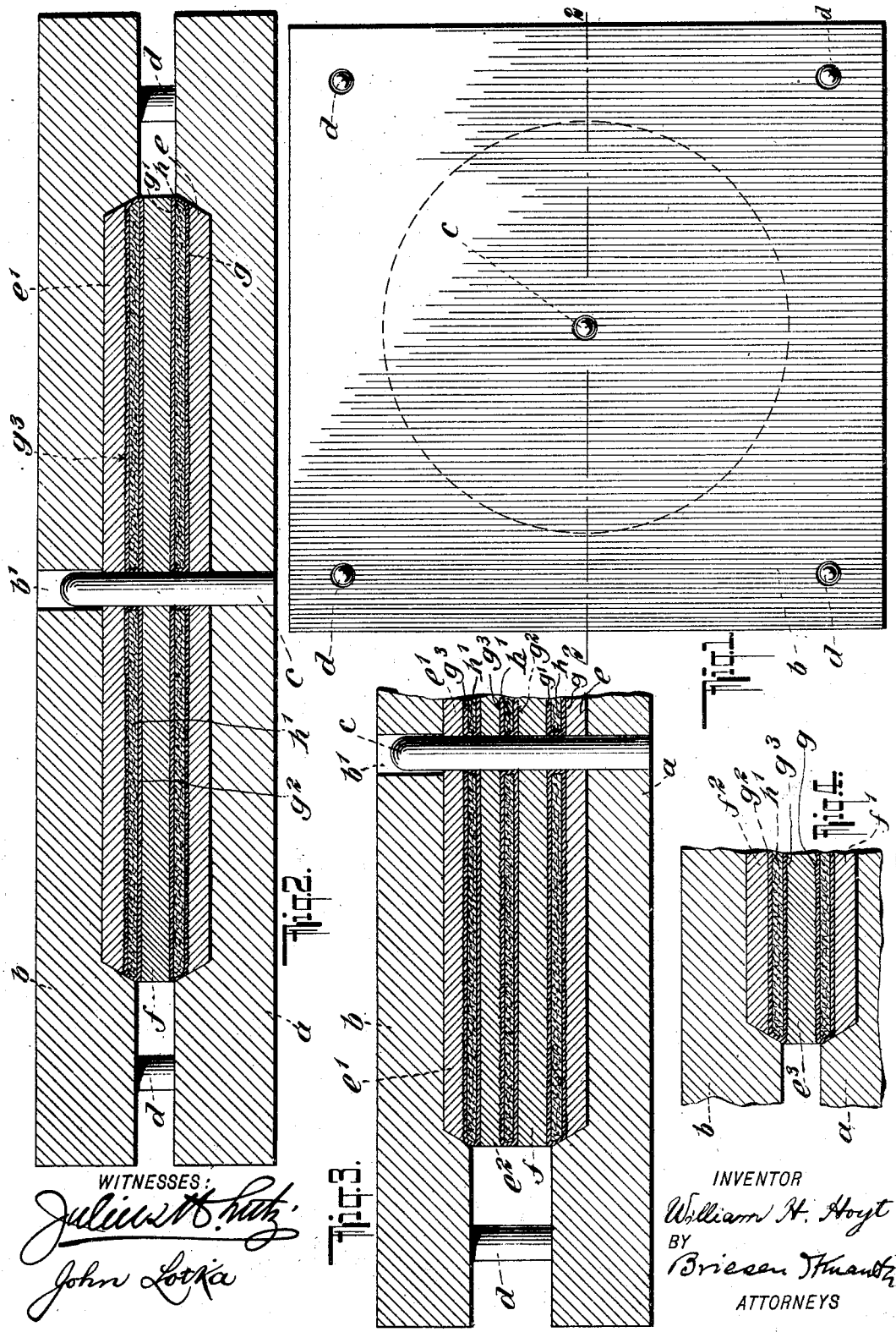
WITNESSES:
INVENTOR
William H. Hoyt
BY
Briesen & Knauth
ATTORNEYS

UNITED STATES PATENT OFFICE.

WILLIAM HELM HOYT, OF WYOMING, NEW JERSEY.

APPARATUS FOR MAKING FLAT TALKING-MACHINE RECORDS.

No. 847,338. Specification of Letters Patent. Patented March 19, 1907.

Application filed February 6, 1906. Serial No. 299,698.

*To all whom it may concern:*

Be it known that I, WILLIAM HELM HOYT, a citizen of the United States, and a resident of Wyoming, in the county of Essex and State of New Jersey, have made and invented certain new and useful Improvements in Apparatus for Making Flat Talking-Machine Records, of which the following is a specification.

My invention relates to the manufacture of flat records or disk records for talking-machines, and has for its object to provide means for making a plurality of such records at one operation.

The invention will be fully described hereinafter and the features of novelty pointed out in the appended claims.

Reference is to be had to the accompanying drawings, in which—

Figure 1 is a plan view of an apparatus suitable for the purposes of my invention. Fig. 2 is a sectional elevation thereof on line 2 2 of Fig. 1. Figs. 3 and 4 are partial sectional elevations showing two other ways of carrying out my invention.

As illustrated in Figs. 1 and 2, the apparatus or mold comprises a bottom plate $a$ and a top plate $b$, which are adapted to be pressed toward each other by any suitable mechanism, such as a hydraulic press. Suitable means are provided for guiding the plates in their relative movement and for properly centering the record. Such means may consist of a center pin $c$, secured to the bottom plate $a$ and projecting into an opening $b'$ of the top plate $b$, and of dowels or guide-pins $d$ likewise secured to the bottom plate $a$ and sliding through suitable openings of the top plate $b$, said guide-pins being located adjacent to the four corners. The opposing faces of the top plate and bottom plate are recessed, as shown, to receive matrices $e$ and $e'$, respectively, the molding-surfaces of which face each other. These matrices may be alike, so as to produce the same record, or they may belong to different records. The apparatus shown in Figs. 1 and 2 further comprises a central plate or backing $f$, preferably made of metal.

In operation after the matrix $e$ has been placed in the recess of the bottom plate $a$ a disk $g$ of celluloid, fiberloid, pyroxylin, hard rubber, or any other hard gramophone material, (preferably, however, celluloid,) is placed on the upwardly-facing molding-surface of the matrix. Then the foundation $h$ is placed on the celluloid disk $g$, said foundation consisting of cardboard or any fibrous or other suitable material which need not be plastic. Then follows another disk $g'$ of celluloid or other gramophone material. Then the metal plate or backing $f$ is placed over the centering-pin $c$ and a celluloid disk $g^2$ and cardboard foundation $h'$ and a celluloid disk $g^3$ are placed on top in substantially the same manner as described for the lower record. Then comes the second or upper matrix $e'$ with its molding-face downward, and finally the top plate $b$. It will of course be understood that all the parts which are slid on the centering-pin $c$ are provided with proper openings for this purpose. The mold having thus been assembled together with the parts of the record is placed in a hydraulic press and there subjected to the requisite amount of pressure. At the same time heat is applied—as, for instance, by means of steam—so as to soften the celluloid or other plastic material, which thus takes the impression from the molding-surfaces of the matrices. At the same time the marginal portion of the celluloid layers or disks will generally melt or be softened sufficiently to form a connection around the edge of the foundations $h$ or $h'$, as shown in Fig. 1, so that the foundation will be entirely enveloped by the celluloid or other plastic substance. After the pressure and heat have been continued a sufficient length of time the press and mold are cooled in any suitable way, as by means of cold water. Then the pressure is released and the finished records are removed from the mold.

While I have described the making of only two records at a time, I desire it to be understood that my invention is applicable to the making of a much larger number of records by one operation. Thus in Fig. 3 I have shown the simultaneous making of three records. The apparatus differs from that shown in Fig. 2 only by the use of an additional matrix $e^2$ between the top matrix $e'$ and the backing-plate $f$. This matrix $e^2$ is substantially the same as the top matrix $e'$, but has its periphery perpendicular instead of slanting. It will be seen without further detailed description how three records are produced by one operation in this instance.

In some cases a matrix may have molding-surfaces on both sides, as shown in Fig. 4, for the matrix $e^3$. The recesses of the bottom plate $a$ and top plate $b$ in this case receive backing-plates $f'$ $f^2$, respectively, instead of the matrices $e$ $e'$. The operation is substantially the same as hereinbefore described.

I have ascertained that up to ten records may be made readily at one operation by the use of my invention.

If desired, a double record having a record-groove on each surface may be produced by placing the record-blank between two matrices the molding-surfaces of which are toward each other.

The process herein described is claimed in a divisional application filed by me August 15, 1906, Serial No. 330,648.

I claim as my invention—

1. An apparatus for making flat talking-machine records, comprising two plates movable toward and from each other, a central guiding-pin on one of the plates, and an intermediate plate fitted on said pin, and forming spaces at each side of said intermediate plate for the reception of record material, one of the surfaces which bound each of such spaces having sound-record grooves, while the other surface bounding the same space acts as a backing.

2. An apparatus for making flat sound-records, comprising opposing end plates movable relatively to each other, an intermediate plate located between said end plates and adapted to be spaced therefrom to accommodate the record material, one of the faces which engage the record material being a molding-surface while the other surface which engages the same record material acts as a backing.

3. An apparatus for making flat sound-records, comprising two end plates movable relatively to each other, matrices engaging said end plates and having molding-grooves on their opposing surfaces, and an intermediate plate located between said matrices and adapted to form a backing for the record material.

4. An apparatus for making flat sound-records, comprising two end plates, a center-pin secured to one of said end plates, matrices fitted on said center-pin and engaging the respective end plates, said matrices having molding-grooves on their opposing surfaces, and an intermediate plate likewise fitted on said center-pin and adapted to form a backing for the record material.

In testimony whereof I have hereunto set my hand in the presence of two subscribing witnesses.

WILLIAM HELM HOYT.

Witnesses:
ELEANOR J. ADAMS,
EDWIN F. HALL.